(12) United States Patent
Antanouski

(10) Patent No.: US 7,429,736 B2
(45) Date of Patent: Sep. 30, 2008

(54) SYSTEM AND DEVICE FOR OBJECT DETECTION AND IDENTIFICATION USING GAMMA, X-RAY AND/OR NEUTRON RADIATION

(76) Inventor: Aliaksandr Alexeevich Antanouski, Scoriny Avenue, 69-11 Minsk (BY) 220013

( * ) Notice: Subject to any disclaimer, the term of this patent is extended or adjusted under 35 U.S.C. 154(b) by 160 days.

(21) Appl. No.: 10/544,279

(22) PCT Filed: Jan. 28, 2004

(86) PCT No.: PCT/BY2004/000003

§ 371 (c)(1), (2), (4) Date: Aug. 3, 2005

(87) PCT Pub. No.: WO2005/073759

PCT Pub. Date: Aug. 11, 2005

(65) Prior Publication Data

US 2006/0290523 A1 Dec. 28, 2006

(51) Int. Cl.
*G01T 1/36* (2006.01)
(52) U.S. Cl. .................................. 250/370.09
(58) Field of Classification Search ............. 250/390.07
See application file for complete search history.

(56) References Cited

U.S. PATENT DOCUMENTS 4,742,227 A * 5/1988 Takenaka ................. 250/336.1
2003/0085163 A1 * 5/2003 Chan et al. .................. 209/589
2004/0119591 A1 * 6/2004 Peeters ................... 340/539.26
2004/0178339 A1 * 9/2004 Gentile et al. ............... 250/282
2005/0105665 A1 * 5/2005 Grodzins et al. ............. 376/157
2005/0205799 A1 * 9/2005 Gentile et al. ............... 250/393

* cited by examiner

*Primary Examiner*—David P. Porta
*Assistant Examiner*—Marcus H Taningco
(74) *Attorney, Agent, or Firm*—Bardmesser Law Group

(57) ABSTRACT

The invention belongs to systems of identification of remote objects by detecting gamma, X-ray and neutron radiations, particularly, to systems allowing to identify objects that are concealed or forbidden to transfer, for example, at customs, checkpoints etc. The task of the present invention is to create mobile and simultaneously high capacity objects monitoring and identification system. Moreover, invention task is to make it possible to develop distributed multilevel system, as for departmental usage, and open system for common usage. The set problem is solved by that the detection unit is made separately with a micro controller and data transfer device, the preprocessing unit is supplied with a channel for data acquisition from detection unit, and processor, and display unit and two-way channel of communication with object identification expert system. The set problem is solved by that the information processing unit is made of two hierarchic separate parts, interconnected by communication channel, one of which is preprocessing unit/units, and second part is expert system, that in case of need can connected by communication channel with the first part, and is located separately with all preprocessing devices service capability.

26 Claims, 3 Drawing Sheets

Figure 1:
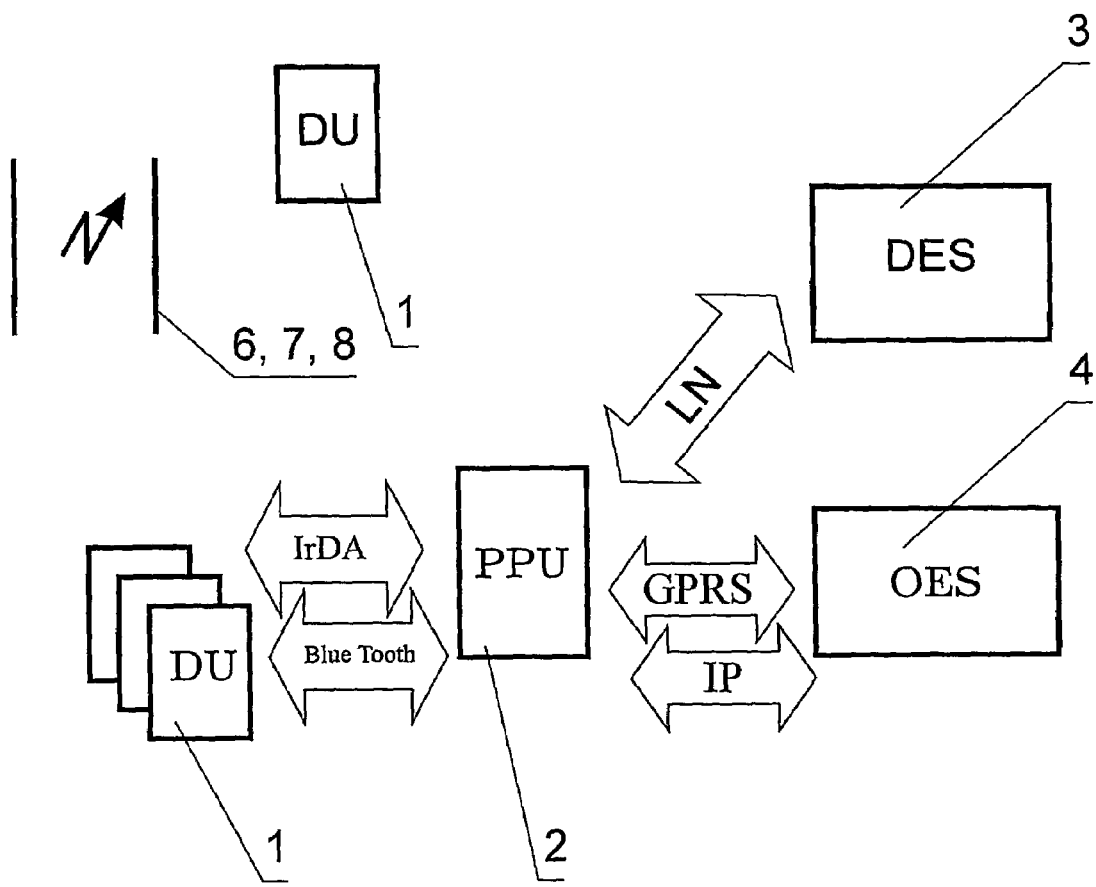

SYSTEM AND DEVICE FOR OBJECT DETECTION AND IDENTIFICATION USING GAMMA, X-RAY AND/OR NEUTRON RADIATION

TECHNICAL FIELD

This invention relates to systems of identifying remote objects by detection of gamma, X-ray and neutron radiations, in particular, to systems that allow the identification of objects that are concealed or forbidden to transport, for example, at customs, border check-points, and the like.

BACKGROUND ART

CZT detectors have been known from "X-Ray and Gamma Ray Detector High Resolution CZT Cadmium Zinc Telluride", web pages, amptek.com, Apr. 11, 2001, 8 pages and "Charge Trapping in XR-100T-CZT Detectors Application Note", web pages, amptek.com, Apr. 18, 2001, 15 pages. A hand-held radiation detector, (CZT spectrometer) designed by Loc-Alamos National Lab. uses a Cadmium-Zink-Tellurium (CZT) semiconductor detector that is capable of identifying gamma and neutron radiation of radioactive materials. In real time the detector produces precise data for the portable device, insensitive to a temperature variation of the environment. The detector includes a CZT chip installed in a housing with a charge-sensitive amplifier and an input-output unit for spectrum analyzing, as well as a multichannel analyzer with a microcontroller. In this device, a specialized software is used that links to a built-in microcontroller and monitoring operations in CZT spectrometer.

A disadvantage of this device is the placement of a gamma and X-rays detector in one housing with a hand computer, which does not allow keeping several sensing devices under the control.

U.S. Pat. No. 6,668,277 describes a multi-channel analyzer designed to conveniently gather, process, and distribute spectrographic pulse data. The multi-channel analyzer may operate on a computer system having memory, a processor, and the capability to connect to a network and to receive digitized spectrographic pulses. The multi-channel analyzer may have a software module integrated with a general-purpose operating system that may receive digitized spectrographic pulses for at least 10,000 pulses per second. The multi-channel analyzer may further have a user-level software module that may receive user-specified controls dictating the operation of the multi-channel analyzer, making the multi-channel analyzer customizable by the end-user. The user-level software may further categorize and conveniently distribute spectrographic pulse data employing non-proprietary, standard communication protocols and formats.

The analog imperfection is a limitation of the functional capabilities of the final device that includes only reception, signal coding from the sensor and its transmission through a multichannel communication line, including Internet signal, corresponding to received signal spectrum.

Also known from U.S. Pat. No. 4,550,381 is a hand-holdable, battery-operated, microprocessor-based spectrometer gun that includes a low-power matrix display and sufficient memory to permit both real-time observation and extended analysis of detected radiation pulses. Universality of the incorporated signal processing circuitry permits operation with various detectors having differing pulse detection and sensitivity parameters.

Utility Model, Russian Federation No 31001, shows as a prototype, a system for a remote radiation control and objects identification containing a stationary detection system of fissionable and nuclear materials, connected with a relevant information monochannel with a personal computer having a display device, information and signalling recording system, with the capability of an information transfer by means of information channels, which is supplied with the videosystem device, connected with video images synchronization device and to fissionable and nuclear materials readings recorder (with a timer).

The imperfection of the known system is in its stationary state—only the objects passing through a window of the fixed system can be checked, and it is impossible for an authorized person to leave a place of observation, thereby leaving the system without control. Moreover the system selected as the prototype, is closed and does not permit the use of additional resources, and also to work simultaneously with different types of detectors.

BRIEF DESCRIPTION OF THE INVENTION

The task of the present invention is to create a mobile and simultaneously high-capacity object detection and identification system according to its gamma, X-ray and/or neutron radiation. Moreover, invention task is to make it possible to develop a distributed multilevel system, for departmental usage, and an open system for common usage.

Briefly, the invention provides a device to detect gamma, X-ray and neutron radiations from an object that includes a detection unit and a preprocessing unit. The detection unit is created separately with a micro controller and a data transfer device. The preprocessing unit is created with a display, microprocessor, input unit, a connecting unit for communicating with an expert system, a channel for data acquisition from the detection unit, and a spectrums analysis unit.

The connecting unit for communicating with the expert system of objects identification is equipped additionally with a channel for bilateral (i.e. two-way) transfer of audio and video information.

A portable computer with connected radiotelephone or other mobile information reception and transfer device, for example, smart phone, or portable computer, is used as preprocessing device.

The preprocessing unit is supplied additionally with a video information input unit, for example, with a video camera.

Several detection units can be used, each supplied with an identification marker to interact with the preprocessing unit.

The detection unit and preprocessing device can be dispose in a common housing and the detection unit may be changeable.

The system of objects identification by gamma, X-ray and neutron radiation includes a detection unit and an information preprocessing unit of two hierarchic parts, one of which is the expert system, located in a networks, and they are interconnected by a communication link. According to the invention, the expert system is connected by a communication link with a national and/or departmental emergency warning system that is activated in case of emergency situations.

The expert system may also include a person—expert in the field of objects identification.

The construction of the device in the form of separate, spaced-apart modules that are interconnected by a communication link, where the detection unit is realized with a separate micro controller, provides implicit advantages, for example, object identification directly in the place where it is, irrespective of identification place and object complexity. The size of the detection unit with a microcontroller can be small and it can be placed in the given place of control zones. Moreover, the departmental network allows the control of all authorized experts staff operation from one working place. Information processing capabilities in every specific situation rise considerably owing to porting of previously adjusted expert system. It is enough to have one central data file for all preprocessing devices servicing, that allows the making of data renew and actualization for all users simultaneously.

The invention is illustrated by drawings.

Figure 2:
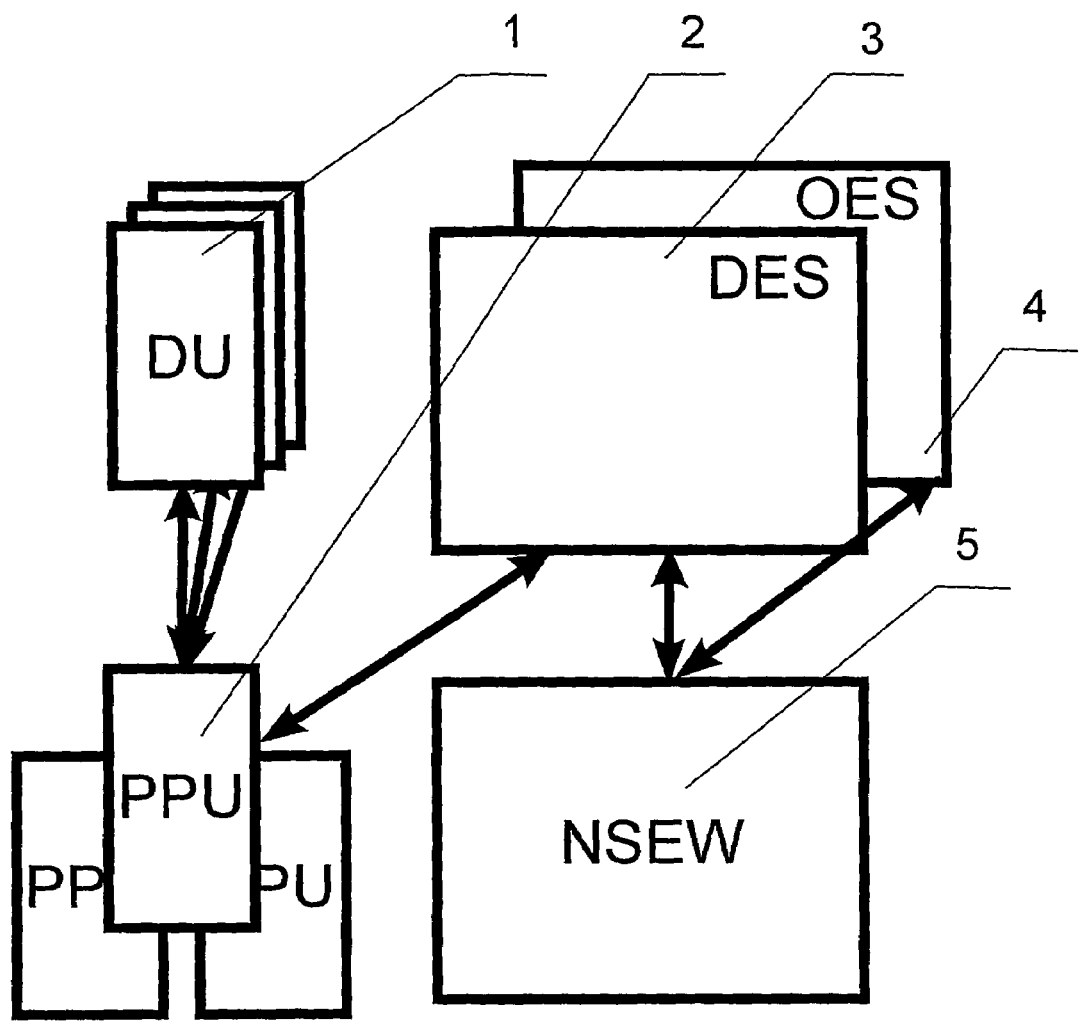
Figure 3:
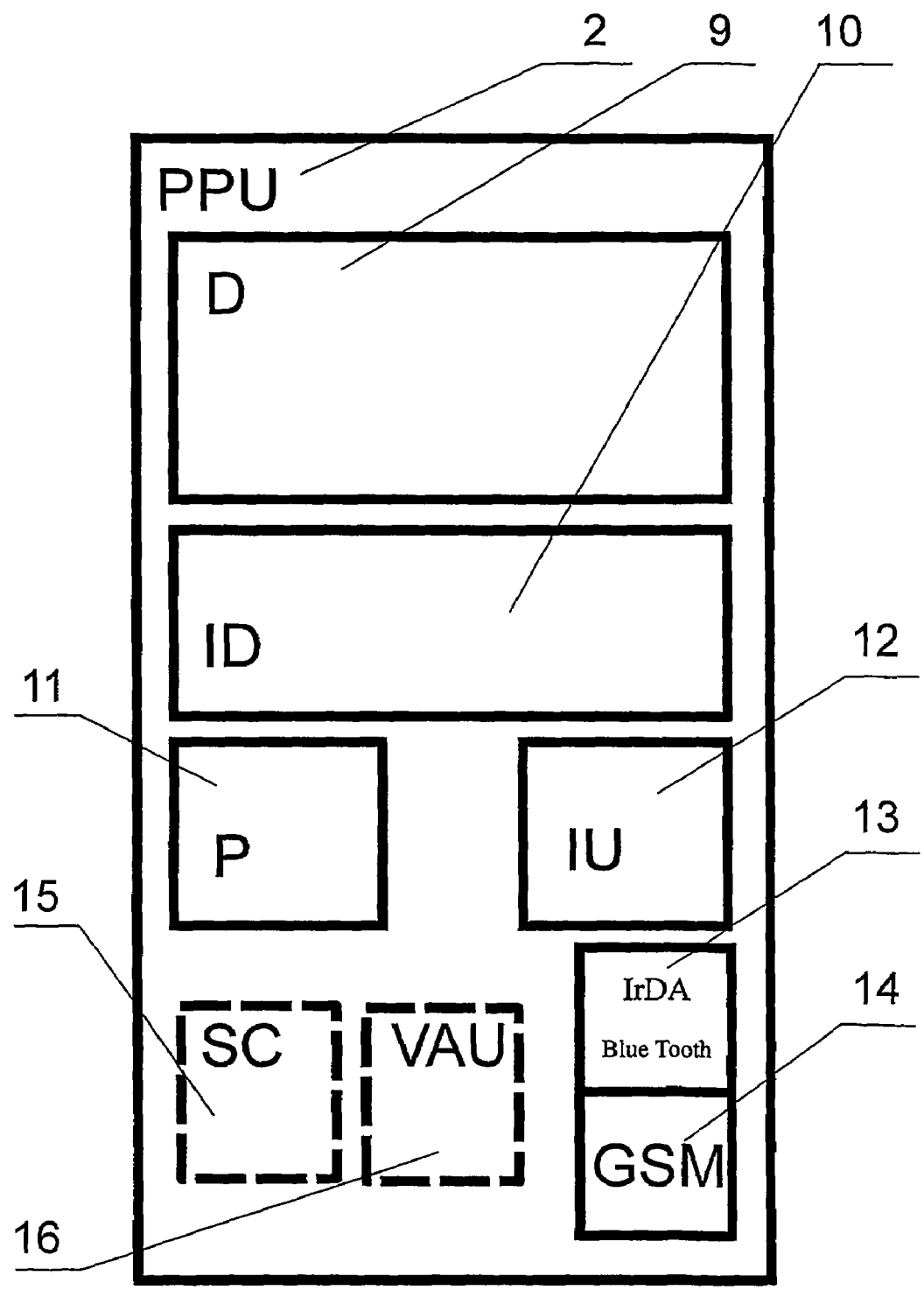

FIG. 1 schematically illustrates a detection system in accordance with the invention;

FIG. 2 schematically illustrates the interaction of the components of the detection system; and FIG. 3 illustrates a block diagram of a preprocessing unit in accordance with the invention.

Referring to FIG. 1, the objects registration and identification device includes the detection unit (DU) 1, preprocessing unit (PPU) 2 with a display and input unit, and departmental expert system (DES) 3. The devices are connected in a local network (LN). The expert system can be located in a open network, for example, an open expert system in Internet (OES) 4. The system can contain national or other state or intergovernmental system of emergency warning (NSEW) 5. When the system is used at a customs terminal, the detection units 1 can be installed in the check points 6, passengers passages 7 and in places of transport thoroughfare 8. The preprocessing unit 2 is located where there is an authorized person (not shown).

Referring to FIG. 3, the preprocessing unit 2 includes display unit D 9 and information input device (ID) 10, which can be realized as keyboard or graphical input (graffiti); processor (P) 11 and interface units (IU) 12. There is specialized software in P, which carries out the following actions:

Selection performance parameters (search, measurement and accumulation of scintillation spectrums);

Identification of a connected DU 1 under its identification number;

Information interchange with DU 1 and information output in D 9;

Objects identification according to accumulated scintillation spectra;

Information exchange through IU 12 with exchange interfaces of Blue Tooth or WI-FI with DES usage or through GSM with GPRS and OES usage.

The device is supplied with a unit of the wireless link 13 with the detection units 1 (for example, IrDA or Blue Tooth) and connection unit 14 (for example, GSM) with DES expert system 3 or OES 4. Preprocessing unit 2 can include a scanner (SC) 15 and information video-audio input unit (VAU) 16.

The device and system work in the following way.

The detection unit 1 can be used as an independently operating device supplied with the microprocessor controller and information transfer devices, and also together with PPU device 2 (which can be any of portable devices (Mobile Device)—smart phone, notebook, communicator etc.). DU 1 should be handled by persons monitoring for gamma, X-ray and neutron radiation sources (RS), or be installed in the specially assigned places. These inspectors should stay in special control zones (custom and/or frontier zones) or in supposed places of RS occurrence (airports, railway or seaports, places of people gathering, control check points of materials, foodstuffs etc.).

Registration of gamma, X-ray and neutron radiation in the search mode is carried out in zones, in which joint action with additional equipment applied for RS check in these zones is possible: transport, foot-passengers or luggage monitors. Upon determination in an RS control zone, a detection signal is transmitted over transmission channels to the preprocessing unit/units 2, where automatic initial identification of this source with the help of PPU 2 intrinsic computing resources occur. If the user is not able at his own to make a decision about the danger of the arisen situation or there are no PPU computing resources 2, for example, the received spectrum is absent in the CPC database, then the user can contact the higher hierarchic expert system (by local network when working with the departmental expert system DES 3 or by GPRS or IP when working with expert system located in common user network OES 4). In this case, the expert system starts to control the user's actions, sending instructions to him and receiving the results of his actions (measured values, accumulated spectrums, etc.). The obtained data are processed by DES 3 or OES 4 and are returned as user instructions for additional monitoring or RS identification. All user actions are saved in the database and can be inspected by the expert after addressing to him. If there are not enough DES 3 resources, the system connects with the expert in the field of objects identification, which can demand additional actions or information from the user, including information on the RS over video channel.

Structurally, the OES or DES are constructed identically, and differ only by arrangement (or in corporate (local) DES network or in OES Internet) and by data and information bases. By request, the user (authorized person) gets instructions from OES or DES, following which a decision on the further actions is made. In the case of non-typical situations, when OES or DES are not able to make a decision, the experts from crisis centers are linked up to the operation, and having analyzed all users actions and theirs results, direct further actions and make a decision on the arisen situation hazard.

In a DU 1 there is a built-in honker, which can be used independently (without PPU) or can be switched-off at the command of PPU. In this case, the honker will be used for an audio alarm.

The DU 1 with PPU 2 is located at the persons exercising control of the detection process automation, searching, localization, measuring, initial identification of gamma, X-ray and neutron radiation sources and checking connection with higher hierarchic system.

In the case of critical situations, for example, when the radiation permissible level is exceeded, or object forbidden to transportation is identified, DES automatically contacts with ENSEW 5. In this case, the authorized persons have duty regulations that provide for immediate localization and an immobilization of the object.

The additional usage of a scanner, for example, for scanning a bar code, makes it possible for an authorized person to increase input speed of the standardized information indicated by a bar code.

The opportunity of linking the PPU 2 and DU 1 in one housing allows an authorized person to localize and check objects in any place, where it is difficult to install the stationary detection units. Owing to that fact, the system mobility is considerably improved. Moreover, the replacement of one detector in the PPU by another, allows readjusting of the device quickly to another radioactive radiation type. Thus, the wire less communication of a DU 1 and PPE 2 allows the replacement of sensors without any wires commutation.

The use of the Internet for an open expert system arrangement allows considerable savings in the user's material resources during system installation in control zones. In this case, the user purchases only detection units and preprocessing units, and can use computing resources in a common user network. At that, the open expert system can operate on a commercial basis.

Thus, usage of all characteristics allows a solution to the set problem—to create the mobile and simultaneously powerful enough objects registration and identification system.

The technical documentation is prepared and the prototype models with smart phone Mitac Mio 8380 are made.

The invention claimed is:

1. An object identification system comprising:
    at least one detection unit for positioning at a check point to detect gamma, X-ray and neutron radiations resulting from nuclear decay from an object being inspected at said check point and emitting a corresponding detection signal thereto, said detection unit including a microprocessor controller and an information transfer device; and
    a preprocessing unit for receiving and analyzing said detection signal to identify the object at said check point, said preprocessing unit including a display unit, an information input device, a processor having a spectrum analysis unit for identification of radioisotopes based on the radiations and a connecting unit for communicating with an expert system for receiving instructions and radioisotope information therefrom for further processing of the object at said check point,
    wherein the detection unit and the preprocessing unit form an integral device in a common housing.

2. The object identification system of claim 1, wherein the connecting unit includes a channel for two-way transfer of audio and video information.

3. The object identification system as set forth in claim 1 wherein said preprocessing unit is a mobile device selected from the group consisting of a smart phone and a notebook.

4. The object identification system of claim 1, wherein the preprocessing unit includes an optical scanner.

5. The object identification system of claim 1, further comprising a plurality of the detection units disposed at a plurality of check points, each the detection unit being connected to the preprocessing unit and including an identification marker.

6. The object identification system of claim 1, further comprising a common housing containing the detection unit and the preprocessing unit.

7. The object identification system of claim 1, wherein the preprocessing unit is selectively connected to a remote expert system for receiving instructions therefrom for further processing of the object at the check point.

8. The object identification system of claim 1, wherein the preprocessing unit has a receiver selectively connected to a global positioning system to determine the geographic location of the object at the check point.

9. The system of claim 1, wherein the common housing includes a personal communicator with a microprocessor for the analyzing of the radiation spectra.

10. The system of claim 1, wherein the common housing includes a mobile telephone with a microprocessor for the analyzing of the radiation spectra.

11. An object identification system comprising:
    at least one detection unit for detecting gamma, X-ray and neutron radiations resulting from nuclear decay in an object being inspected at the check point, the detection unit emitting a corresponding detection signal, the detection unit including a microprocessor controller and an information transfer device;
    a preprocessing unit for receiving and analyzing the detection signal to identify the object, the preprocessing unit including a display unit, an information input device, a processor having a spectrum analysis unit and a connecting unit for communicating with an expert system for receiving instructions therefrom for further processing of the object,
    wherein the detection unit and the preprocessing unit form an integral device in a common housing; and
    an expert system remote from the detection unit for receiving instructions from the preprocessing unit for further processing of the object and having a communication channel connected to one of a national emergency warning system and a departmental emergency warning system.

12. The object identification system of claim 11, wherein the preprocessing unit has a receiver selectively connected to a global positioning system to determine the geographic location of the object at the check point.

13. The system of claim 11, wherein the common housing includes a personal communicator with a microprocessor for the analyzing of the radiation spectra.

14. The system of claim 11, wherein the common housing includes a mobile telephone with a microprocessor for the analyzing of the radiation spectra.

15. A portable hand-held system for identification of a radiation source, the system comprising:
    a portable detection unit that detects ionizing radiation from nuclear decay in the radiation source and provides a corresponding detection signal based on the detected radiation;
    a spectrum analysis unit for analyzing a radiation spectrum corresponding to radioisotope signatures detected by the detection unit;
    a display unit for displaying results of the spectrum analysis; and
    a connecting unit for communicating with an expert system and for receiving instructions and radioisotope information for further processing of the radiation source,
    wherein the detection unit, the spectrum analysis unit, the display unit and the connecting unit form an integral device in a common housing.

16. The system of claim 15, wherein the common housing includes a mobile telephone that includes a microprocessor for the analyzing of the radiation spectra.

17. The system of claim 15, wherein the ionizing radiation includes gamma radiation.

18. The system of claim 15, wherein the ionizing radiation includes X-ray radiation.

19. The system of claim 15, wherein the ionizing radiation includes a neutron radiation.

20. The system of claim 15, wherein the ionizing radiation includes neutron, gamma and X-ray radiation.

21. The system of claim 15, wherein the system includes a global positioning system receiver, and wherein the connecting unit communicates current position of the system to the expert system.

22. The system of claim 21, wherein the system includes a mobile telephone that includes a microprocessor for the analyzing of the radiation spectrum.

23. The system of claim 15, wherein the system includes a global positioning system receiver.

24. The system of claim 15, wherein the system is connected using a wireless protocol to a mobile device that includes a microprocessor for the analyzing of the radiation spectra, the mobile device being any of a laptop, a personal communicator and a mobile telephone.

25. The system of claim 15, wherein the common housing includes a personal communicator with a microprocessor for the analyzing of the radiation spectra.

26. A portable hand-held system for identification of a radiation source, the system comprising:
    a portable detection unit that detects gamma radiation, X-ray radiation and neutron radiation emitted due to nuclear decay in the radiation source being inspected and provides a corresponding detection signal based on the radiation;

a radioisotope analysis unit for analyzing radiation detected by the detection unit for determining radioisotope information;

a display unit for displaying results of the analysis to a user, including radiation spectrum and the radioisotope information;

a GPS receiver providing a current position information; and a connecting unit for communicating the results of the analysis and the current location to a remote computer, wherein the detection unit, the radioisotope analysis unit, the display unit, the GPS receiver and the connecting unit form an integral device.

* * * * *